(Model.)
2 Sheets—Sheet 1.
J. T. SARGENT.
WASH BOARD.
No. 467,439.　　　　　　　Patented Jan. 19, 1892.
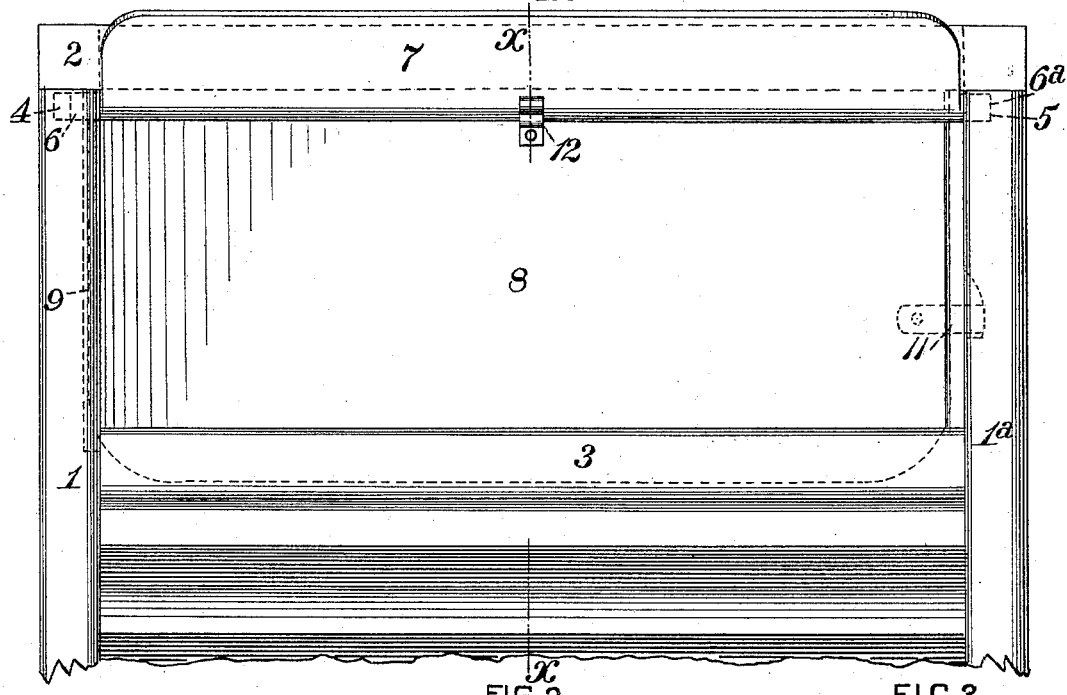
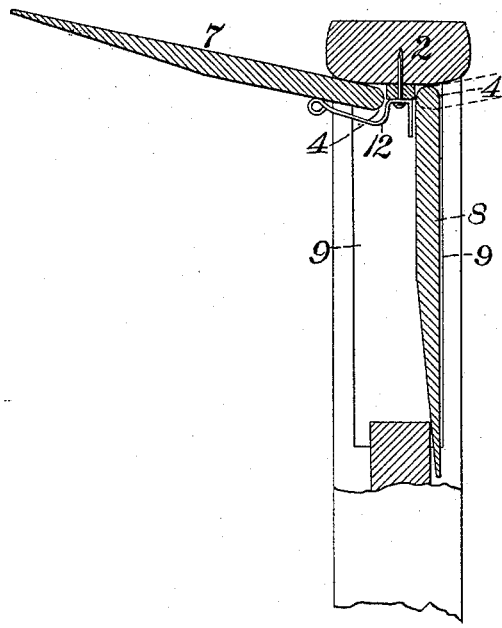
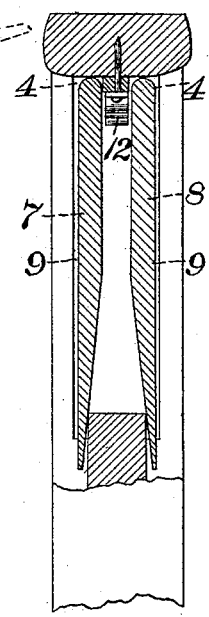
WITNESSES:
INVENTOR,
James T. Sargent
by George H. Christy
Att'y.

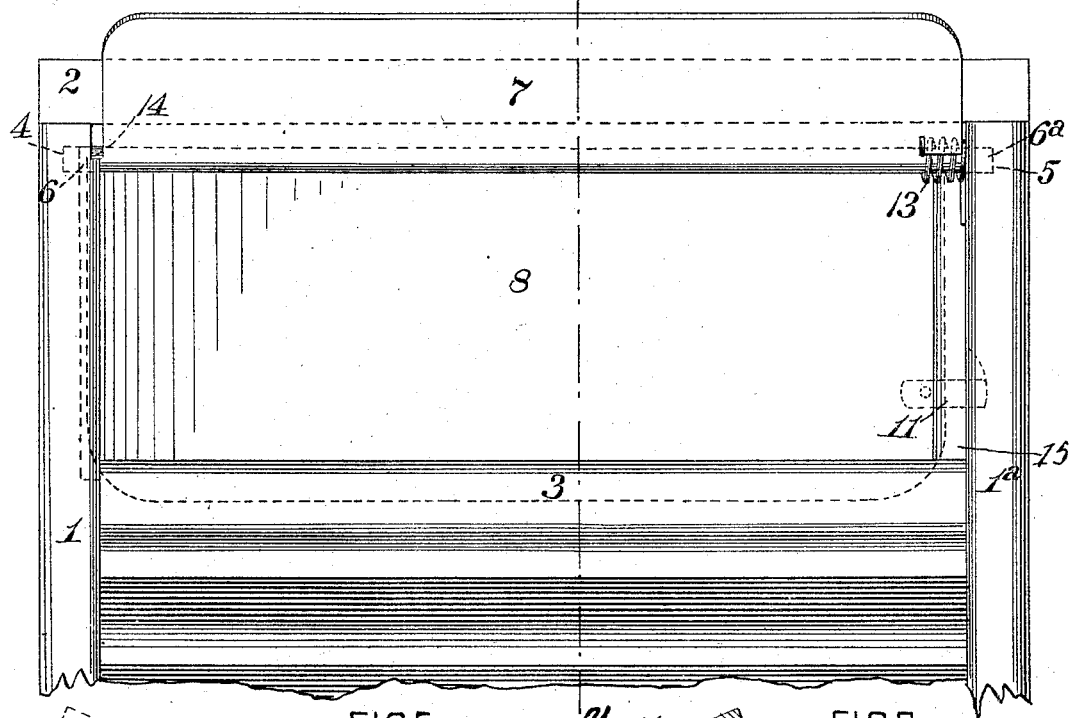
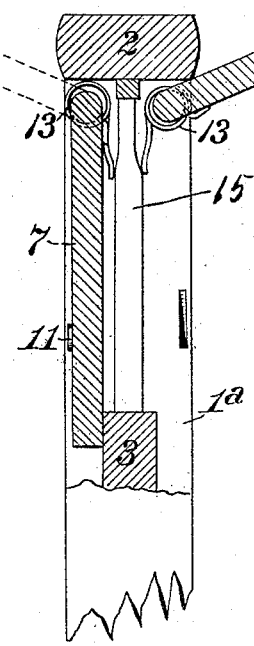
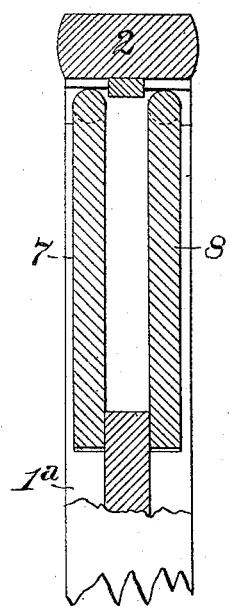

UNITED STATES PATENT OFFICE.

JAMES T. SARGENT, OF CLEVELAND, OHIO.

WASH-BOARD.

SPECIFICATION forming part of Letters Patent No. 467,439, dated January 19, 1892.

Application filed April 15, 1891. Serial No. 388,978. (Model.)

*To all whom it may concern:*

Be it known that I, JAMES T. SARGENT, a citizen of the United States, residing at Cleveland, in the county of Cuyahoga and State of Ohio, have invented or discovered a certain new and useful Improvement in Wash-Boards, of which improvement the following is a specification.

The invention described herein has for its object certain improvements in double-faced wash-boards, said improvements consisting, generally stated, in so constructing and mounting the protectors as to permit of their being employed alternately as protector and brand-board or bottom of the soap-box, all as more fully hereinafter described and claimed.

In the accompanying drawings, forming a part of this specification, Figure 1 is a view in front elevation of a wash-board embodying my invention, one of the protectors being shown in a raised position, while the other is closed down. Fig. 2 is a sectional view, the plane of section being indicated by the line $x\ x$, Fig. 1. Fig. 3 is a view similar to Fig. 2, both protectors being closed down. Fig. 4 is a view similar to Fig. 1, showing springs for supporting the protectors in a raised position and for shifting them in the direction of their length. Figs. 5 and 6 are sectional views on the line $y\ y$, Fig. 4, looking in opposite directions, respectively.

In the practice of my invention the wash-board is constructed as regards the side bars 1 1ᵃ, head-piece 2, and cross-bar 3 in the usual or any desired manner. The brand-board usually employed for forming the bottom of the soap-boxes is omitted. Two sockets or seats 4 and 5 are formed in each of the side bars 1 and 1ᵃ, respectively, the sockets in each bar being located on opposite sides and a short distance away from the median line of the bar, as shown in Figs. 2 and 3. In the seats or sockets are mounted the pivot-pins 6 6ᵃ of the protectors 7 and 8, which are made of a length not greater than the distance between the side bars and of such a width that when folded down they will close or partially close the opening formed by side bars, head-piece, and cross-bar, as shown in Figs. 1 and 4. The sockets or seats in one of the side bars, as 1, are made of sufficient depth relative to the lengths of the pivot-pins as to permit of a longitudinal movement of the protectors when folded down between the side bars. Grooves or recesses 9 are also formed in the bar 1, said grooves extending along the bar for a distance approximately equal to the width of the protectors, which, when folded down, are shifted in the direction of their length until their ends at one end enter and are held as against outward and upward movement by the grooves or recesses 9. Catches 11, adapted to engage the side bars 1ᵃ, may be placed on the ends of the protectors opposite those in engagement with the grooves in the bar 1, thereby locking the protectors more securely in their folded positions and preventing any tendency to warping or twisting.

In order to hold the protectors in their raised positions, a bracket or arm 12 is pivotally attached to the head-piece between the protectors, so that it may be turned out under either one of the protectors when raised. In lieu of the arm or bracket a spring 13 may be placed around one or both of the pivot-pins, one end of the spring being fastened to the protectors and the other one resting on strip 15 on the side bar or otherwise secured to a stationary part of the wash-board, said spring being placed under sufficient tension to raise and support the protectors when free to move, as shown in Figs. 4 and 5. This spring may be so applied as to serve the further function of shifting the protectors longitudinally when folded down, so as to cause their edges to enter the grooves or recesses 9.

If desired, notches 14 may be formed in the side bar 1, said notches being so located that the protectors may, when raised, be shifted longitudinally into said notch, thereby locking them in their raised position, and when such a lock is employed the spring 13 will serve to shift the protectors longitudinally in their raised as well as in their folded positions. This form of locking device *per se*, however, forms a part of the subject-matter of another application, Serial No. 388,977, filed April 15, 1891, and is not claimed herein.

It will be readily understood from the foregoing that either of the protectors can be used as such, while the other one is folded down between the side bars and forms the bottom of the soap-box, and that both protectors may be folded and locked down for transportation or storage.

I claim herein as my invention—

1. In combination with a double-faced wash-board and folding protectors pivoted on opposite sides of the median line of the side bars and longitudinally movable between the side bars, grooves or recesses in one of the side bars for the reception of the ends of the protector when folded down, the protectors being adapted to serve, when in a closed position, as a brand-board or bottom of the soap-box, substantially as set forth.

2. In combination with a double-faced wash-board and a folding pivoted protector on each side of the wash-board and longitudinally movable between the side bars, grooves or recesses in one of the side bars for the reception of the ends of the protectors when folded down and means for supporting the protectors when raised, the protectors being adapted to serve, when in a closed position, as a brand-board or bottom of the soap-box, substantially as set forth.

3. In combination with a double-faced wash-board and a folding pivoted protector on each side of the wash-board and longitudinally movable between the side bars, grooves or recesses in one of the side bars for the reception of the end of each of the protectors when folded and catches on the opposite ends of the protectors for locking said ends to the adjacent side bar, the protectors being adapted to serve, when in a closed position, as a brand-board or bottom of the soap-box, substantially as set forth.

4. In combination with a double-faced wash-board and a folding pivoted protector for each side of the wash-board and longitudinally movable between the side bars of the wash-board, grooves or recesses in one of the side bars for the reception of the ends of the protectors when folded and a spring for shifting the protector longitudinally, the protectors being adapted to serve, when in a closed position, as a brand-board or bottom of the soap-box, substantially as set forth.

In testimony whereof I have hereunto set my hand.

JAMES T. SARGENT.

Witnesses:
J. B. STOWE,
N. H. HILLIARD.